United States Patent
Grossklaus, Jr. et al.

(10) Patent No.: US 6,544,346 B1
(45) Date of Patent: Apr. 8, 2003

(54) METHOD FOR REPAIRING A THERMAL BARRIER COATING

(75) Inventors: Warren D. Grossklaus, Jr., West Chester, OH (US); Roger D. Wustman, Loveland, OH (US); John M. Powers, Independence, KY (US); Jeffrey A. Conner, Hamilton, OH (US); Jon C. Schaeffer, Milford, OH (US)

(73) Assignee: General Electric Company, Schenectady, NY (US)

( * ) Notice: Subject to any disclaimer, the term of this patent is extended or adjusted under 35 U.S.C. 154(b) by 790 days.

(21) Appl. No.: 08/886,504

(22) Filed: Jul. 1, 1997

(51) Int. Cl.$^7$ ................................................. B08B 7/04
(52) U.S. Cl. .................. 134/29; 134/22.17; 134/22.18; 134/34
(58) Field of Search .............................. 134/2, 3, 22.1, 134/22.18, 22.17, 26, 29, 34, 41

(56) References Cited

U.S. PATENT DOCUMENTS

| | | | |
|---|---|---|---|
| 4,073,662 A | * 2/1978 | Borom | 134/2 |
| 4,134,777 A | * 1/1979 | Borom | 134/2 |
| 4,141,781 A | * 2/1979 | Greskovich et al. | 134/29 X |
| 4,317,685 A | * 3/1982 | Ahuja et al. | 134/2 |
| 4,439,241 A | * 3/1984 | Ault et al. | 134/22.17 |
| 4,508,577 A | 4/1985 | Conn et al. | 134/1 |
| 4,552,594 A | 11/1985 | Von Vaskuilen et al. | 134/34 |
| 4,726,104 A | 2/1988 | Foster et al. | 29/156.8 B |
| 4,889,589 A | * 12/1989 | McComas | 134/3 |
| 5,167,720 A | 12/1992 | Diamond et al. | 134/25.4 |
| 5,167,721 A | 12/1992 | McComas et al. | 134/32 |
| 5,290,364 A | * 3/1994 | Stein et al. | 134/7 |
| 5,380,564 A | 1/1995 | VanKuiken, Jr. et al. | 427/456 |
| 5,421,517 A | 6/1995 | Knudson et al. | 239/225.1 |
| 5,614,054 A | * 3/1997 | Reeves et al. | 134/3 |
| 5,643,474 A | * 7/1997 | Sangeeta | 134/2 |
| 5,658,614 A | 8/1997 | Basta et al. | 427/253 |
| 5,679,270 A | * 10/1997 | Thornton et al. | 216/101 |

OTHER PUBLICATIONS

1. Chapman, Gerald, Pipe Coating is Removed by Waterjet Technology, Nov. 4, 1988, pp. 102& 106.
2. Louis, H. And Schikorr, W., Fudamental Apects in Cleaning with High–Speed Water Jets, Apr. 6–8, 1982.

* cited by examiner

*Primary Examiner*—Alexander Markoff
(74) *Attorney, Agent, or Firm*—David L. Narciso; Gary M. Hartman; Domenica N.S. Hartman

(57) ABSTRACT

A method of repairing a thermal barrier coating on a component designed for use in a hostile thermal environment, such as turbine, combustor and augmentor components of a gas turbine engine. The method is particularly suited for completely removing a thermal insulating ceramic layer of thermal barrier coating system that includes a metallic bond coat, such as a diffusion aluminide or MCrAlY coating, between the surface of the component and the ceramic layer, while leaving the bond coat substantially undamaged. Furthermore, the method of this invention includes a technique by which ceramic material within cooling holes in the component can be removed without damaging the underlying bond coat. The process steps generally include removing the ceramic layer from the surface of the component by subjecting the ceramic layer to a caustic solution at an elevated temperature and pressure, and then removing ceramic material from the cooling hole by carefully directing a high-velocity fluid stream into the cooling hole. According to this invention, the high-velocity fluid stream is able to overcome the compressive stresses that otherwise anchor the ceramic in the cooling hole, yet does not remove or damage the bond coat underlying the ceramic.

9 Claims, 1 Drawing Sheet

METHOD FOR REPAIRING A THERMAL BARRIER COATING

FIELD OF THE INVENTION

The present invention relates to protective coatings for components exposed to high temperatures, such as components of a gas turbine engine. More particularly, this invention is directed to a method for removing and refurbishing a thermal barrier coating system that includes an inner metallic bond coat and an outer thermal-insulating ceramic layer.

BACKGROUND OF THE INVENTION

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor or augmentor. A common solution is to protect the surfaces of such components with an environmental coating system, such as an aluminide coating or a thermal barrier coating system (TBC). The latter includes an environmentally-resistant bond coat and a layer of thermal insulating ceramic applied over the bond coat. Bond coats are typically formed from an oxidation-resistant alloy such as MCrAlY where M is iron, cobalt and/or nickel or from a diffusion aluminide or platinum aluminide that forms an oxidation-resistant intermetallic. During high temperature excursions, these bond coats form an oxide layer or scale that chemically bonds the ceramic layer to the bond coat. Zirconia ($ZrO_2$) that is partially or fully stabilized by yttria ($Y_2O_3$), magnesia (MgO) or other oxides has been widely employed as the material for the ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure.

Though significant advances have been made with coating materials and processes for producing both the environmnentally-resistant bond coat and the thermal insulating ceramic layer, there is the inevitable requirement to remove and replace the ceramic layer under certain circumstances. For example, removal may be necessitated by erosion or impact damage to the ceramic layer during engine operation, or by a requirement to repair certain features such as the tip length of a turbine blade. Removal of the ceramic layer may also be necessitated during component manufacturing to address such problems as defects in the coating, handling damage and the need to repeat noncoating-related manufacturing operations which require removal of the ceramic, e.g., electrical-discharge machining (EDM) operations.

The current state-of-the-art repair methods often result in removal of the entire TBC system, i.e., both the ceramic layer and bond coat, after which the bond coat and ceramic layer must be redeposited. Prior art abrasive techniques for removing thermal barrier coatings have generally involved grit blasting, vapor honing and glass bead peening, each of which is a slow, labor-intensive process that erodes the ceramic layer and bond coat, as well as the substrate surface beneath the coating. With repetitive use, these removal processes eventually destroy the component by erosion. Damage is particularly likely when treating an air-cooled turbine blade, whose surface includes cooling holes from which cooling air is discharged in order to cool the external surfaces of the blade.

Consequently, significant effort has been directed to developing nonabrasive processes for removing ceramic coatings. One such method disclosed in U.S. Pat. No. 4,889,589 involves the use of a fluoride-containing gas at elevated temperatures. This process removes both ceramic coatings and their aluminide bond coats. Yet another nonabrasive process involves the use of a high pressure waterjet, as reported in U.S. Pat. No. 5,167,721. While this waterjet technique is described as not removing the bond coat, in practice the waterjet can inflict significant damage to bond coats and particularly diffusion aluminide bond coats, which are brittle beneath about 1200° F. (about 650° C.). Damage generally occurs by the fracturing of brittle phases in the bond coat, such as $PtAl_2$ phases of a platinum-aluminide bond coat, and/or the additive layer, which is the outermost bond coat layer containing an environmentally-resistant intermetallic phase MAl, where M is iron, nickel or cobalt, depending on the substrate material. Similar to grit blasting techniques, bond coat damage from the waterjet process is particularly likely when treating an air-cooled turbine blade. Damage is particularly acute around the cooling holes of these blades because ceramic within the holes is anchored by compressive stresses that develop when the newly coated component cools from typical coating temperatures, e.g., above about 1800° F. (about 980°0 C.) for ceramic deposited by PVD techniques. Consequently, to remove the ceramic from a cooling hole, excessive dwell times are required to overcome this strong mechanical bond as well as the chemical bond between the ceramic and oxide layers, resulting in significant damage or removal of the bond coat in and around the cooling holes.

Another nonabrasive process capable of selectively removing a ceramic layer of a TBC system is an autoclaving process in which a turbine blade is subjected to elevated temperatures and pressures in the presence of a caustic compound. This process has been found to sufficiently weaken the chemical bond between the ceramic and bond coat oxide layers to permit removal of the ceramic layer while leaving the bond layer intact. However, as with the previous methods discussed above, this process also is incapable of removing ceramic from the cooling holes of an air-cooled turbine blade. A more recent nonabrasive process for removing a TBC system is disclosed in U.S. patent application Ser. No. 08/362,377 to Reeves et al, assigned to the assignee of this invention. This process entails heating the TBC to about 870° C. or more while exposing the coating to a halogen-containing powder, which causes the entire coating to deteriorate to the extent that it separates from the underlying substrate. Both the ceramic layer and the bond coat must be redeposited as a result of the halogen-containing powder attacking each of these layers. However, this process also has been found to be unsuccessful at removing ceramic mechanically held in the cooling holes of a turbine blade.

From the above, it can be seen that the complete removal of the ceramic layer of a TBC system from a turbine engine component is complicated if the component is formed to have cooling holes at its exterior surface. Removal of ceramic from a cooling hole is particularly difficult if the component has a complex cooling scheme in which the cooling holes are carefully configured to discharge a film of air that spreads across the external surfaces of the component. The performance of such a component is directly related to the ability to provide uniform film cooling of the component surfaces. However, air-cooled components that have been coated with an insulating ceramic layer, processed through previous TBC removal techniques, and subsequently recoated with a ceramic layer have unacceptable air film distribution and reduced airflow as a result of the buildup of ceramic in the cooling holes on top of residual ceramic from the initial coating. As discussed above, prior art methods are either unsuccessful at removing the ceramic from a cooling hole or inflict severe damage to the surface area surrounding the cooling hole during the process of removing the ceramic. Subsequent heating of the component prior to, during or after any one of the above-noted removal processes has been found to be insufficient to relax the severe compressive stresses that firmly anchor the ceramic material inside the cooling holes.

Accordingly, what is needed is a process capable of removing a ceramic layer of a TBC system without damaging or removing the underlying bond coat, and further capable of removing ceramic coating material from cooling holes of an air-cooled component.

SUMMARY OF THE INVENTION

According to the present invention, there is provided a method of repairing a thermal barrier coating system on a component designed for use in a hostile thermal environment, such as turbine, combustor and augmentor components of a gas turbine engine. This method is particularly suited for completely removing a thermal insulating ceramic layer of a thermal barrier coating system that includes a metallic bond coat, such as a diffusion aluminide or MCrAlY coating, between the surface of the component and the ceramic layer, such that the bond coat remains substantially undamaged from the removal process. In particular, the method of this invention entails a technique by which ceramic material within cooling holes in the component can be removed without damaging the underlying bond coat.

The processing steps of this invention generally include removing the ceramic layer from the surface of the component by subjecting the ceramic layer to a caustic solution at an elevated temperature and pressure, during which the chemical bond between the ceramic layer and the oxide layer on the underlying bond coat is attacked without damaging or removing the bond coat. Thereafter, the method of this invention entails a further step of removing ceramic material from cooling holes present in the component by directing a high-velocity fluid stream into the cooling holes. According to this invention, once the ceramic layer from the surrounding surface area of the component is removed, a sufficiently high-velocity fluid stream has been found to be able to overcome the compressive stresses that otherwise mechanically anchor the ceramic in the cooling hole, yet does not remove or damage the bond coat within the cooling hole.

Using the method of this invention, the ceramic layer is completely removed from the component and any cooling holes, with essentially no degradation of the bond coat. Accordingly, this invention allows deposition of a new ceramic coating on components in production without refurbishment or replacement of the bond coat and without depositing additional ceramic in the cooling holes, which would be detrimental to the performance of the component. If the component has been in service, such that the bond coat has been partially depleted as a result of oxidation, the bond coat can be refurbished by an aluminiding technique, such as pack cementation or vapor phase aluminiding technique.

Refurbishment by aluminiding is applicable to both diffusion aluminide and MCrAlY bond coats. Ceramic material can then be deposited on the surface of the refurbished bond coat so as to form a new insulating ceramic layer. The autoclave process of this invention also serves to remove any oxides from internal blade surfaces, allowing for the possibility of rejuvenation of internal coating as well during the aluminizing process.

Importantly, prior art techniques for removing a ceramic layer of a TBC have not enabled the above-noted refurbishment technique for air-cooled components, in that such techniques either cannot remove ceramic from the cooling holes or excessively damage the bond coat in the process. As a result of this invention, the labor, processing and costs required to refurbish a thermal barrier coating system are significantly reduced by avoiding damage and removal of the bond coat. In addition, the service life of a component can also be extended by avoiding replacement of its entire thermal barrier coating system, since removal of a bond coat results in loss of wall thickness because bond coats are inter-diffused with their blade substrates. Another significant advantage is that the process of this invention is less time-consuming and more efficient than if a waterjet were used alone to remove the ceramic layer. Furthermore, because the present invention enables the removal of ceramic from cooling holes, the performance of a component treated according to the process of this invention is promoted by the restored uniform film cooling of the component surfaces.

Other objects and advantages of this invention will be better appreciated from the following detailed description.

DETAILED DESCRIPTION OF THE INVENTION

The present invention is generally applicable to metal components that are protected from a thermally and chemically hostile environment by a thermal barrier coating system. Notable examples of such components include the high and low pressure turbine nozzles and blades, shrouds, combustor liners and augmentor hardware of gas turbine engines. While the advantages of this invention are particularly applicable to gas turbine engine components having complex geometries, the teachings of this invention are generally applicable to any component on which a thermal barrier may be used to thermally insulate the component from its environment.

Figure 1:
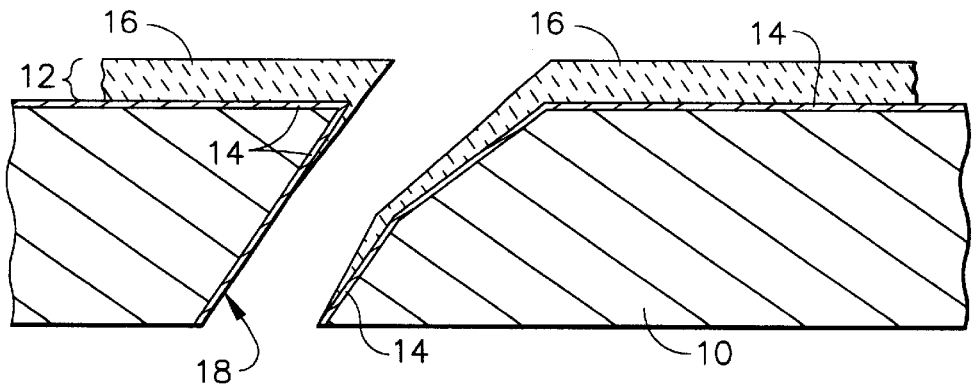
FIG. 1 is a sectional view of a gas turbine engine blade on which is formed a thermal barrier coating system comprising a ceramic layer adhered to the surface of the blade with a bond coat, with the coating system shown extending into a cooling hole in the blade.
Figure 2:
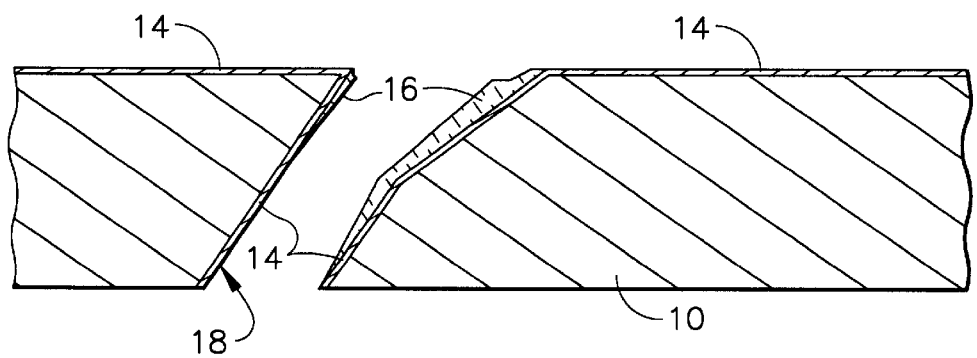
FIG. 2 represents a cross-sectional view of the blade following removal of the ceramic layer from the surface of the blade in accordance with this invention.
Figure 3:
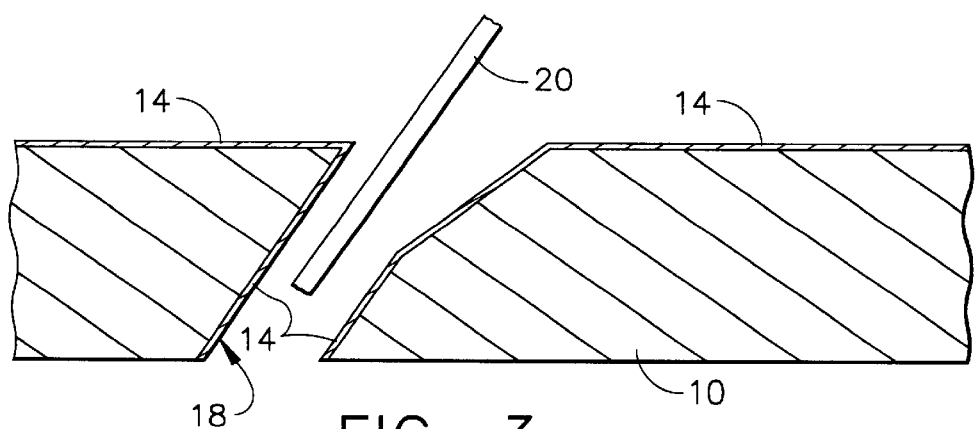
FIG. 3 represents a cross-sectional view of the blade following removal of the ceramic layer from the cooling hole in accordance with this invention.

As depicted in FIG. 1, the method of this invention is particularly suited for the repair of a thermal barrier coating system 12 composed of a diffusion aluminide and/or MCrAlY bond coat 14 formed on the surface of a turbine blade 10 or another air-cooled component, and a ceramic layer 16 overlaying the bond coat 14 so as to be adhered to the blade 10. As is the situation with high temperature components of a gas turbine engine, the blade 10 may be formed of an iron, nickel or cobalt-base superalloy. The bond coat 14 has an oxidation-resistant composition that forms an alumina ($Al_2O_3$) layer or scale (not shown) on its surface during exposure to elevated temperatures. The alumina scale protects the underlying superalloy substrate from oxidation and provides a surface to which the ceramic layer 16 more tenaciously adheres.

The ceramic layer 16 is preferably deposited by physical vapor deposition using techniques known in the art, e.g., EBPVD, to yield a strain-tolerant columnar grain structure, as is depicted in the Figures. Alternatively, the ceramic layer 16 could be deposited by other known processes, such as air plasma spraying (APS) and low pressure plasma spraying (LPPS). A preferred material for the ceramic layer 16 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$).

The method of this invention entails removing a ceramic layer 16 without removing or damaging the bond coat 14 so as to permit deposition of a new ceramic layer on the blade 10. The ceramic layer 16 may be damaged or eroded from service, or may require removal for another reason such as reconfiguration of the blade during processing. As evident from FIG. 1, removal of the ceramic layer 16 is complicated by the presence of ceramic material in a cooling hole 18, an inevitable result of the cooling hole 18 being present in the blade 10 prior to application of the ceramic layer 16. According to this invention, the ceramic layer 16 at the surface of the blade 10 is removed by exposure to a caustic solution at an elevated temperature and pressure. Such a process is preferably carried out in an autoclave operated at a temperature of about 200° F. to about 600° F. (about 90° C. to about 315° C.) and a pressure of about 150 psi to about 500 psi (about 1 MPa to about 3.5 MPa). Preferred caustic compounds for this process are potassium hydroxide (KOH) and sodium hydroxide (NaOH). A duration of about two to about eight hours is generally sufficient to weaken the chemical bond between the ceramic layer 16 and the alumina scale on the bond coat 14, though it is foreseeable that longer or shorter durations may be preferred depending on the properties of the particular coating system.

Following the autoclave step, the blade 10 is processed through a carefully controlled operation that uses a high pressure fluid stream 20 targeted at the cooling hole 18. While various fluids could be used, water is preferred as being environmentally safe and because it will not chemically affect the bond coat 14 or the underlying superalloy substrate. According to the invention, water pressurized to about 20,000 to about 60,000 psi (about 1380 to about 4130 bar) and then discharged from three to six nozzles, each having a diameter of about 0.005 to about 0.014 inch (about 0.13 to about 0.36 millimeter) and spaced about 0.5 to about 3.0 inches (about 1 to about 8 centimeters) from the targeted surface, has been found to provide sufficient energy to overcome the compressive stresses that otherwise mechanically anchor the ceramic in the cooling hole 18, yet surprisingly does not remove or damage the bond coat 14 underlying the ceramic in the cooling hole 18. Once the ceramic layer 16 from the surrounding surface area of the blade 10 has been removed by the autoclave process, a sufficiently high-velocity fluid stream is capable of overcoming the compressive stresses that otherwise mechanically anchor the ceramic in the cooling hole 18, yet can be applied in such a manner as to avoid damage and removal of the bond coat 14 within the cooling hole 18. A preferred angle of attack for the waterjet is something other than coaxial to the cooling hole 18, e.g., at an angle to the wall of the hole 18 while enabling the stream 20 to contact all ceramic 16 within the hole 18.

The result of the above combined autoclave and waterjet processes is that the blade 10 is essentially free of all residual ceramic on its surface and in the cooling hole 18, while the bond coat 14 remains intact and undamaged. Such a result is surprising in that prior art autoclave processes have been incapable of removing ceramic from cooling holes of an air-cooled component and, while capable of removing ceramic from cooling holes, prior art waterjet processes have resulted in excessive damage and removal of the bond coat from the surface area of the component surrounding the cooling hole. Consequently, this invention enables the ceramic layer of an air-cooled component to be completely replaced without accumulating additional ceramic in the cooling holes of the component and without damaging the bond coat, which would otherwise require additional processing steps to repair or replace the bond coat. This capability of the invention enables refurbishment of components that have seen service in an oxidizing environment, such that the bond coat 14 has been depleted to some degree by continued growth of the alumina scale. The bond coat 14, whether a diffusion aluminide or MCrAlY-type, is preferably refurbished using a diffusion aluminiding technique such as pack cementation or vapor phase aluminiding. Thereafter, a new ceramic layer is deposited on the bond coat 14 using standard application parameters, preferably by a physical vapor deposition technique such as EBPVD.

According to this invention, the above-described process provides the key advantage of removing the ceramic layer 16 that was intentionally deposited on the surface of the blade 10, as well as ceramic material that was deposited in the cooling hole 18 during deposition of the original ceramic layer 16. The above-described combination of an autoclave process followed by a waterjet process enables subsequent processing that yields a blade 10 having a fully restored ceramic layer 16 and a cooling hole 18 whose shape or contour is restored to attain the intended cooling flow and flow distribution over the surface of the blade 10, distribution being the important function of diffuser cooling holes of the type depicted in the Figures. The bond coat 14 on the surface of the blade 10 and in the cooling hole 18 is left intact, contrary to prior art methods that damage or remove some or all of the bond coat 14 at the surface of the blade 10, necessitating replacement of the bond coat 14 prior to reapplication of the ceramic layer 16. Notably, prior art waterjet processes used alone can remove the bond coat 14 as well as some substrate material in and around the cooling hole 18, changing the diameter, shape and/or contour of the cooling hole 18 from the original design intent. Finally, the combination of using a caustic solution in an autoclave process to remove the ceramic layer 16 at the surface of the blade 10, followed by a waterjet process to selectively remove residual ceramic from cooling holes 18 in the blade 10, enables rapid removal of ceramic with minimal equipment time and costs. Finally, this invention enables a refurbishment process by which, after removal of all ceramic on an air-cooled component, an over-aluminiding process can be performed as needed to replenish the oxide-forming reservoir provided by the bond coat.

While the invention has been described in terms of a preferred embodiment, it is apparent that other forms could be adopted by one skilled in the art. For example, other processes could possibly be used to degrade the chemical bond between the ceramic layer and bond coat prior to the waterjet process. In addition, the geometry of a cooling hole from which ceramic is removed can differ from that shown in the Figures. Therefore, the scope of the invention is to be limited only by the following claims.

What is claimed is:

1. A method comprising the steps of:

providing an air-cooled component with a diffusion aluminide or MCrAlY bond coat on a surface thereof and a thermal-insulating ceramic layer adhered to the component by the bond coat, the component having a cooling hole that intersects the surface of the component, the cooling hole having a wall coated by contiguous portions of the bond coat and ceramic layer that extend into the cooling hole from the surface of the component, the portion of the ceramic layer being mechanically anchored to the cooling hole by compressive stresses;

removing the ceramic layer from the surface of the component by subjecting the ceramic layer to a caustic solution at a temperature and pressure sufficient to cause the caustic solution to attack a chemical bond between the ceramic layer and the bond coat; and then removing the portion of ceramic layer from the cooling hole by directing into the cooling hole a fluid stream discharged from a source at a pressure of about 20,000 to about 60,000 psi through at least one nozzle having a diameter of about 0.005 to about 0.014 inch placed about 0.5 to about 3.0 inches from the wall of the cooling hole;

wherein the step of removing the portion of ceramic layer from the cooling hole does not remove the bond coat from the wall of the cooling hole.

2. A method as recited in claim 1, wherein the step of removing the ceramic layer from the surface of the component entails an elevated temperature of at least about 90° C. and an elevated pressure of at least about one MPa.

3. A method as recited in claim 1, wherein the caustic solution contains potassium hydroxide and/or sodium hydroxide.

4. A method as recited in claim 1, wherein the step of providing the component with the ceramic layer entails a physical vapor deposition technique and wherein the ceramic layer and the portion of the ceramic layer are formed of zirconia partially or fully stabilized with yttria.

5. A method as recited in claim 1, wherein the component is a component of a gas turbine engine.

6. A method as recited in claim 1, further comprising the step of depositing a ceramic layer on the surface of the component after removing the portion of ceramic layer from the cooling hole.

7. A method as recited in claim 6, wherein the depositing step entails a physical vapor deposition technique.

8. A method as recited in claim 1, further comprising the step of refurbishing the bond coat after removing the portion of ceramic layer from the cooling hole.

9. A method as recited in claim 8, wherein the refurbishing step entails an aluminiding technique.

* * * * *